(12) United States Patent
Xu et al.

(10) Patent No.: US 8,583,569 B2
(45) Date of Patent: Nov. 12, 2013

(54) FIELD-PROGRAMMABLE GATE ARRAY BASED ACCELERATOR SYSTEM

(75) Inventors: Ning-Yi Xu, Beijing (CN); Xiong-Fei Cai, Beijing (CN); Feng-Hsiung Hsu, Cupertino, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/335,333

(22) Filed: Dec. 22, 2011

(65) Prior Publication Data

US 2012/0092040 A1   Apr. 19, 2012

Related U.S. Application Data

(62) Division of application No. 11/737,605, filed on Apr. 19, 2007, now Pat. No. 8,117,137.

(51) Int. Cl.
  *G06F 15/18* (2006.01)
(52) U.S. Cl.
  USPC .......................................................... 706/12
(58) Field of Classification Search
  USPC ..................................................... 706/12, 16
  See application file for complete search history.

(56) References Cited

U.S. PATENT DOCUMENTS

| | | |
|---|---|---|
| 5,320,538 A | 6/1994 | Baum |
| 5,423,554 A | 6/1995 | Davis |
| 5,432,895 A | 7/1995 | Myers |
| 5,490,784 A | 2/1996 | Carmein |
| 5,577,981 A | 11/1996 | Jarvik |
| 5,712,922 A | 1/1998 | Loewenthal et al. |
| 5,883,628 A | 3/1999 | Mullaly et al. |
| 5,892,961 A | 4/1999 | Trimberger |
| 5,892,962 A | 4/1999 | Cloutier |
| 5,913,727 A | 6/1999 | Ahdoot |
| 6,011,407 A | 1/2000 | New |
| 6,037,914 A | 3/2000 | Robinson |
| 6,064,749 A | 5/2000 | Hirota et al. |
| 6,084,979 A | 7/2000 | Kanade et al. |
| 6,102,832 A | 8/2000 | Tani |

(Continued)

FOREIGN PATENT DOCUMENTS

EP   1170868 A1   1/2002

OTHER PUBLICATIONS

Berkun, A.C. et al. "An Advanced FPGA-Based Processor and Controller for the Next Generation Precipitation Rader". IEEE. 2002. pp. 780-782.*

(Continued)

*Primary Examiner* — Jeffrey A Gaffin
*Assistant Examiner* — Benjamin Buss
(74) *Attorney, Agent, or Firm* — Lee & Hayes, PLLC (57) ABSTRACT

Accelerator systems and methods are disclosed that utilize FPGA technology to achieve better parallelism and flexibility. The accelerator system may be used to implement a relevance-ranking algorithm, such as RankBoost, for a training process. The algorithm and related data structures may be organized to enable streaming data access and, thus, increase the training speed. The data may be compressed to enable the system and method to be operable with larger data sets. At least a portion of the approximated RankBoost algorithm may be implemented as a single instruction multiple data streams (SIMD) architecture with multiple processing engines (PEs) in the FPGA. Thus, large data sets can be loaded on memories associated with an FPGA to increase the speed of the relevance ranking algorithm.

20 Claims, 7 Drawing Sheets

(56) References Cited

U.S. PATENT DOCUMENTS

| | | | |
|---|---|---|---|
| 6,122,627 A | 9/2000 | Carey et al. | |
| 6,134,540 A | 10/2000 | Carey et al. | |
| 6,141,034 A | 10/2000 | McCutchen | |
| 6,144,985 A * | 11/2000 | Rompe | 709/200 |
| 6,199,008 B1 | 3/2001 | Aratow et al. | |
| 6,222,757 B1 | 4/2001 | Rau et al. | |
| 6,226,237 B1 | 5/2001 | Chan et al. | |
| 6,356,637 B1 | 3/2002 | Garnett | |
| 6,408,257 B1 | 6/2002 | Harrington et al. | |
| 6,477,527 B2 | 11/2002 | Carey et al. | |
| 6,567,834 B1 | 5/2003 | Marshall et al. | |
| 6,601,049 B1 | 7/2003 | Cooper | |
| 6,611,823 B1 | 8/2003 | Selmic et al. | |
| 6,662,470 B2 | 12/2003 | Ellis, III | |
| 6,751,600 B1 | 6/2004 | Wolin | |
| 6,945,869 B2 | 9/2005 | Kim et al. | |
| 6,951,515 B2 | 10/2005 | Ohshima et al. | |
| 6,999,083 B2 | 2/2006 | Wong et al. | |
| 7,001,272 B2 | 2/2006 | Yamashita et al. | |
| 7,024,033 B2 | 4/2006 | Li et al. | |
| 7,050,078 B2 | 5/2006 | Dempski | |
| 7,099,745 B2 | 8/2006 | Ebert | |
| 7,138,963 B2 | 11/2006 | Hobgood et al. | |
| 7,162,054 B2 | 1/2007 | Meisner et al. | |
| 7,197,497 B2 | 3/2007 | Cossock | |
| 7,318,051 B2 | 1/2008 | Weston et al. | |
| 7,369,869 B2 | 5/2008 | Wiatrowski et al. | |
| 7,398,093 B2 | 7/2008 | Hull et al. | |
| 7,446,772 B2 | 11/2008 | Wong et al. | |
| 7,526,101 B2 | 4/2009 | Avidan | |
| 7,529,732 B2 * | 5/2009 | Liu et al. | 707/999.01 |
| 7,660,793 B2 | 2/2010 | Indeck et al. | |
| 7,707,163 B2 | 4/2010 | Anzalone et al. | |
| 7,805,438 B2 | 9/2010 | Liu et al. | |
| 7,840,482 B2 | 11/2010 | Singla et al. | |
| 7,844,085 B2 | 11/2010 | Lu et al. | |
| 8,117,137 B2 | 2/2012 | Xu et al. | |
| 2002/0010734 A1 | 1/2002 | Ebersole et al. | |
| 2002/0123977 A1 | 9/2002 | Raz | |
| 2002/0167536 A1 | 11/2002 | Valdes et al. | |
| 2003/0002731 A1 | 1/2003 | Wersing et al. | |
| 2004/0111388 A1 | 6/2004 | Boiscuvier et al. | |
| 2004/0136471 A1 | 7/2004 | Pao et al. | |
| 2004/0193441 A1 | 9/2004 | Altieri | |
| 2004/0225483 A1 | 11/2004 | Okoniewski et al. | |
| 2005/0049913 A1 | 3/2005 | Huddleston et al. | |
| 2005/0144149 A1 | 6/2005 | Li et al. | |
| 2005/0234953 A1 | 10/2005 | Zhang et al. | |
| 2005/0246328 A1 | 11/2005 | Zhang et al. | |
| 2005/0280661 A1 | 12/2005 | Kobayashi et al. | |
| 2006/0013473 A1 | 1/2006 | Woodfill et al. | |
| 2006/0038833 A1 | 2/2006 | Mallinson et al. | |
| 2006/0047704 A1 | 3/2006 | Gopalakrishnan | |
| 2006/0105838 A1 | 5/2006 | Mullen | |
| 2006/0110028 A1 | 5/2006 | Liu et al. | |
| 2006/0122834 A1 * | 6/2006 | Bennett | 704/256 |
| 2006/0126740 A1 | 6/2006 | Lin et al. | |
| 2006/0136411 A1 | 6/2006 | Meyerzon et al. | |
| 2006/0149883 A1 | 7/2006 | Benbow et al. | |
| 2006/0224532 A1 | 10/2006 | Duan et al. | |
| 2006/0262140 A1 | 11/2006 | Kujawa et al. | |
| 2006/0294059 A1 | 12/2006 | Chamberlain et al. | |
| 2007/0022063 A1 | 1/2007 | Lightowler | |
| 2007/0035562 A1 | 2/2007 | Azuma et al. | |
| 2007/0038944 A1 | 2/2007 | Carignano et al. | |
| 2007/0073749 A1 | 3/2007 | Fan | |
| 2007/0110298 A1 | 5/2007 | Graepel et al. | |
| 2007/0132785 A1 | 6/2007 | Ebersole, Jr. et al. | |
| 2007/0162448 A1 | 7/2007 | Jain et al. | |
| 2007/0233679 A1 | 10/2007 | Liu et al. | |
| 2007/0244884 A1 | 10/2007 | Yang | |
| 2008/0004865 A1 | 1/2008 | Weng et al. | |
| 2008/0018668 A1 | 1/2008 | Yamauchi | |
| 2008/0025579 A1 * | 1/2008 | Sidlauskas et al. | 382/124 |
| 2008/0027912 A1 | 1/2008 | Liu et al. | |
| 2008/0027925 A1 | 1/2008 | Li et al. | |
| 2008/0033939 A1 | 2/2008 | Khandelwal | |
| 2008/0060034 A1 | 3/2008 | Egnal et al. | |
| 2008/0097938 A1 | 4/2008 | Guyon et al. | |
| 2008/0114724 A1 | 5/2008 | Indeck et al. | |
| 2008/0126275 A1 | 5/2008 | Crnojevic et al. | |
| 2008/0140589 A1 | 6/2008 | Basu et al. | |
| 2008/0150963 A1 | 6/2008 | Stambaugh | |
| 2008/0262984 A1 | 10/2008 | Xu et al. | |
| 2009/0031104 A1 | 1/2009 | Vorbach et al. | |
| 2009/0157571 A1 | 6/2009 | Smith et al. | |
| 2009/0240680 A1 | 9/2009 | Tankovich et al. | |
| 2009/0265290 A1 | 10/2009 | Ciaramita et al. | |
| 2009/0287620 A1 | 11/2009 | Xu | |
| 2009/0287621 A1 | 11/2009 | Krupka et al. | |

OTHER PUBLICATIONS

Dowle, J. et al. "An FPGA-Based MIMO and Space-Time Processing Platform". Hindawi Publishing Corporation. EURASIP Journal on Applied Signal Processing. Volume 2006, Article ID 34653, pp. 1-14. DOI 10.1155/ASP/2006/34653.*

Porikli, F. "Achieving real-time object detection and tracking under extreme conditions". Journal Real-Time Image Processing (2006), vol. 1, pp. 33-40. Springer. Published onine Aug. 18, 2006. DOI 10.1007/s11554-006-0011-z.*

He, J. et al. "Manifold-Ranking Based Image Retrieval". MM'04, Oct. 10-16, 2004, New York, New York, USA. ACM. 2004. pp. 9-16.*

Zhou, X.S. et al. "A Discussion of Nonlinear Variants of Biased Discriminants for Interactive Image Retrieval". CIVR 2004, Lecture Notes in Computer Science, vol. 3115, 2004, pp. 353-364.*

Porikli, F. "Integral Histogram: A FastWay to Extract Histograms in Cartesian Spaces". Proceedings of the 2005 IEEE Computer Society Conference on Computer Vision and Pattern Recognition (CVPR'05). IEEE. 2005. 8 pages.*

Microsoft Computer Dictionary, Fifth Edition. Definition of "Document" on p. 171. Microsoft Press, 2002. 3 pages.*

Dementhon, D. et al. "Relevance Ranking of Video Data Using Hidden Markov Model Distances and Polygon Simplification". Visual 2000, LNCS 1929, pp. 49-61, 2000.*

Waring, C.A. et al. "Face Detection Using Spectral Histograms and SVMs". IEEE Transactions on Systems, Man, and Cybernetics-Part B: Cybernetics, vol. 35, No. 3, Jun. 2005. pp. 467-476.*

Liu, X. et al. "Image and Texture Segmentation Using Local Spectral Histograms". IEEE Transactions on Image Processing, vol. 15, No. 10, Oct. 2006. pp. 3066-3077.*

Yan, R. et al. "Co-retrieval: a boosted reranking approach for video retrieval". IEE Proceedings Vision, Image and Signal Processing, vol. 152, Issue 6, pp. 888-895. IEE Proceedings online No. 20045188. Published online Jul. 5, 2005. doi: 10.1049/ip-vis:20045188.*

Wong, K.-M. et al. "MPEG-7 Dominant Color Descriptor Based Relevance Feedback Using Merged Palette Histogram". ICASSP 2004. IEEE, 2004. pp. 433-436.*

Office Action for U.S. Appl. No. 12/238,012, mailed on Mar. 16, 2012, Ning-Yi Xu, "Automated Feature Selection Based on Rankboost for Ranking", 24 pgs.

Liu, et al., "Gradient Feature Selection for Online Boosting", IEEE, In the Proceedings of the 11th International Conference on Computer Vision, 2007, pp. 14-21 (8 pgs.).

Agarwal et al., "Proceesing of the NIPS 2005 Workshop on Learning to Rank", NIPS, Dec. 9, 2005, Whistler BC, Canada, 44 pages including pp. 1-pp. 40.

Akesson et al., "Augmented Virtuality: A Method to Automatically Augment Virtual Worlds with Video Images", Abstract, Preface and Table of Contents for Master Thesis at Swedish Institute of Computer Science, Nov. 1997, full text found at http://www.sics.se/~kalle/projects/Master_Thesis/Index.html., 5 pgs.

Aryashev, et al., "Parallel FPGA Processor Card for Distributed Information Processing", retrieved on Mar. 7, 2007, at <<http://www.niisi.ru/old/pap_for.htm>>, pp. 1-11.

Billinghurst et al., "Collaborative Mixed Reality", In Proceedings of the 1st Intl Symposium on Mixed Reality (ISMR 99), Japan, Mar. 1999, 16 pgs.

(56) References Cited

OTHER PUBLICATIONS

Burges, et al, "Learning to Rank with Nonsmooth Cost Functions", retrieved at <<http://research.microsoft.com/~cburges/papers/lambdarank.pdf>>, 2006, Microsoft, pp. 1-8.

Cloutier et al, "VIP: An FPGA-Based Processor for Image Processing and Neural Networks", Proceedings of MicroNeuro' 96, IEEE, 1996, pp. 330-pp. 336.

Cuenca et al., "Reconfigurable Frame-Grabber for Real-Time Automated Visual inspection (RT-AVI) Systems", FPL2001, LNCS 2147, 2001, pp. 223-pp. 231.

De Fuentes, "A Parallel Programming Model for a Multi-FPGA Multiprocessor Machine", Thesis, University of Toronto, 2006, pp. 1-pp. 89.

Dillinger et al., "FPGA Based Real-Time Image Segmentation for Medical Systems and Data Processing", IEEE, 2005, pp. 161-pp. 165.

Eick et al., "Hardware Accelerated Algorithms for Semantic Processing of Document Streams", IEEE Aerospace Conference, Big Sky, MT, Mar. 4-11, 2006, pp. 1-pp. 14.

Farber, et al, "Parallel Neural Network Training on Multi-Spert", retreived at <<http://ieeexplore.ieee.org/iel4/5245/14210/00651531.pdf?tp=&isnumber=14210&arnumber=651531>>, IEEE, 1997, pp. 659-666.

Fischer, et al., "Stylized Augmented Reality for Improved Immersion". <<http://www.gris.uni-tuebingen.de/people/staff/bartz/Publications/paper/vr2005.pdf>> Last accessed on Aug. 17, 2007.

"Fpga-Press-3x: Data/ Image compression PCI -Board", available at least as early as Mar. 6, 2007, at <<www.gemac-chemnitz.de/all_pdf_files/fpga-board-flyer.pdf>>, pp. 1-2.

Ghoting et al., "A Characterization of Data Mining Algotiyhms on a Modern Processor", Proceeding of the First International Workshop on Data Management on New Hardware (DaMon 2005), Jun. 12, 2005, Baltimore MD, pp. 1- pp. 6.

Huang, et al, "Improving the Back Propagation Learning Speed with Adaptive Neuro-Fuzzy Technique", retrieved at <<http://ieeexplore.ieee.org/iel4/5797/15470/00714328.pdf?tp=&isnumber=15470&arnumber=714328>>, IEEE, 1993, pp. 2897-2900.

Joachims, "Optimizing Search Engines Using Clickthrough Data," retreived at http://www.cs.cornell.edu/People/tj/publications/joachims_02c.pdf, SIGKDD 02, Edmonton, Alberta, Canada, 2002, 10 pgs.

Julier, et al., "Information Filtering for Mobile Augmented Reality". Jul. 2, 2002. <<http://www.ait.nrl.navy.mil/3dvmel/papers/j_IEEECGA02.pdf>>.

Lemoine, et al., "Run Time Reconfiguration of FPGA for Scanning Genomic DataBases", retrieved on Mar. 7, 2007, at <<doi.ieeecomputersociety.org/10.1109/FPGA.1995.477414>>, IEEE, 1995, pp. 1-2, Abstract only.

Li, et al, "Learning to Rank Using Classification and Gradient Boosting", retrieved at <<http://research.microsoft.com/~cburges/papers/BoostTreeRank.pdf>>, Microsoft, 2007, pp. 1-10.

Littlefield, "Board vendor FPGA toolkits make or break your project", available at least as early as Mar. 6, 2007, at <<www.cwcembedded.com/documents/contentdocuments/Article-MES-August-2006.pdf>>, Military Embedded Systems, 2006, pp. 1-4.

McElligott et al., "ForSe FIElds—Force Sensors for Interactive Environments", Lecture Notes in Computer Science, UbiComp 2002: Ubiquitous Computing, 4th Intl Conf, Sweden Sep. 2002, vol. 2498, 8 pgs.

McGettrick et al., "Searching the Web with an FPGA based Search Engine", ARC 2007, LNCS 4419, pp. 350-pp. 357.

Melnik et al, "Concave Learners for Rankboost," retreived at <<http://jmlr.csail.mit.edu/papers/volume8/melnik07a/melnik07a.pdf>>, Journal of Machine Learning Research, Apr. 25, 2007, pp. 791-812.

Muir, "Virtual Reality vs Composite Reality" Blog, retrieved on Jun. 6, 2007, at http://citrite.org/blogs/jeffreymuir/2007/02/22/virtual-reality-vs-composite-reality/, Feb. 22, 2007, 3 pages.

Mutlu et al., "Address-Value Delta (AVD) Prediction: A Hardware Technique for Efficiently Parallelizing Depending Cache Misses", IEEE Transactions on Computers, vol. 55, No. 12., 2006, pp. 1491-pp. 1508.

Nair et al., "An FPGA-Based People Detection System", EURASIP Journal on Applied Signal Processing 2005:7, pp. 1047-pp. 1061.

Final Office Action for U.S. No. Appl. 11/737,605, mailed on Jun. 9, 2011, "Field-Programmable Gate Array Based Accelerator System".

Non-Final Office Action for U.S. Appl. No. 12/238,239. mailed on Aug. 16, 2011, Vincent, David Robert, "Field-Programmable Gate Array Based Accelerator System" 14 pages.

Non-Final Office Action for U.S. Appl. No. 12/238,012, mailed on Aug. 30, 2011, Ning-Yi Xu, "Automated Feature Selection Based on Rankboost for Ranking", 17 pages.

Piekarski et al., "ARQuake: The Outdoor Augmented Reality Gaming System", Communications of the ACM, vol. 45, No. 1, Jan. 2002, pp. 36-38.

Raykar, et al, "A Fast Algorithm for Learning a Ranking Function from Large Scale Data Sets", retrieved at <<http://www.umiacs.umd.edu/users/vikas/publications/raykar_PAMI_2007.pdf>>, IEEE, Aug. 22, 2007, pp. 0-29.

Rose et al., "Annotating Real-World Objects Using Augmented Reality", Computer Graphics: Developments in Virtual Environments (Proc. CG Intl 95 Conf), Jun. 1995, 21 pgs.

Sestito, et al., "Intelligent Filtering for Augmented Reality". <<www.siaa.asn.,au/get/2395365383.pdf>> Last accessed on Aug. 17, 2007.

Simsarian et al., "Windows on the World: An Example of Augmented Virtuality", retrieved on Jun. 6, 2007 and found at http://www.sics.se/~kalle/published/wow.pdf, 7 pages.

Teitel, "The Eyephone: A Head-Mounted Stereo Display", Abstract, Proceedings of SPIE, Sep. 1990, Stereoscopic Displays and Applications, vol. 1256, 2 pgs.

Torresen, et al, "A Review of Parallel Implementations of Backpropagation Neural Networks", retrieved at <<http://ifi.uio.no/~jimtoer/chp2.ps>>, Chapter 2 in the book by N. Sundararajan and P. Saratchandran (editors): Parallel Architectures for Artificial Neural Networks, IEEE CS Press, 1998, pp. 41-118.

Usunier et al, "Boosting Weak Ranking Functions to Enhance Passage Retrieval for Question Answering," retrieved at <<http://eprints.pascal-network.org/archive/00000428/02/BosWRF2EPR_IR4QA04.pdf, SIGIR 2004, Jul.25-29, 2004, Sheffield, England, 6 pgs.

Vu et al., "Using RankBoost to Compare Retrieval Systems", CIKM 2005, Proceeding of the 14th ACM International Conference in Information and Knowledge Management, 2005, pp. 309-pp. 310.

Wikipedia, "Augmented Virtuality", retrieved on Jun. 6, 2007, at http://en.wikipedia.org/wiki/Augmented_virtuality, 1 pg.

Wikipedia, "EyeToy", retrieved on Jun. 6, 2007, found at http://en.wikipedia.org/wiki/EyeToy, 5 pages.

Xilinx, Virtex-II Pro FPGAs: The Highest System Performance; The Lowest System Cost, Product Brochure, 2004, pp. 1-pp. 2.

Xu et al, "FPGA-based Accelerator Design for RankBoost in Web Search Engines," retrieved at <<http://www.doc.ic.ac.uk/~wl/teachlocal/cuscomp/papers/fpt07nx.pdf, IEEE, 2007, 8 pgs, Dec. 2007.

Yang et al., "Implementation of an RBF Neural Network on Embedded Systems: Real-Time Face Tracking and Identity Verification", IEEE Transactions on Neural Networks, vol. 14, No. 5, Sep. 2003, pp. 1162-pp. 1175.

Yue et al., "On Using Simultaneous Perturbation Stochastic Approximation of IR Measures, and the Empirical Optimality of LambdaRank", NIPS Machine Learning for Web Search Workshop, 2007, pp. 1-pp. 8.

\* cited by examiner

| | PE0 | PE1 | PE2-6 | PE7 |
|---|---|---|---|---|
| | F(0,0) | F(1,0) | ⋮ | F(7,0) |
| | F(8,0) | F(9,0) | ⋮ | F(15,0) |
| | F(16,0) | F(17,0) | ⋮ | F(23,0) |
| | ⋮ | ⋮ | ⋮ | ⋮ |
| | F(120,0) | F(121,0) | ⋮ | F(127,0) |
| | F(0,1) | F(1,1) | ⋮ | F(7,1) |
| | F(8,1) | F(9,1) | ⋮ | F(15,1) |
| | F(16,1) | F(17,1) | ⋮ | F(23,1) |
| | ⋮ | ⋮ | ⋮ | ⋮ |
| | F(120,1) | F(121,1) | ⋮ | F(127,1) |
| | ⋮ | ⋮ | ⋮ | ⋮ |
| | F(0,N-1) | F(1,N-1) | ⋮ | F(7,N-1) |
| | F(8,N-1) | F(9,N-1) | ⋮ | F(15,N-1) |
| | F(16,N-1) | F(17,N-1) | ⋮ | F(23,N-1) |
| | ⋮ | ⋮ | ⋮ | ⋮ |
| | F(120,N-1) | F(121,N-1) | ⋮ | F(127,N-1) |

FIELD-PROGRAMMABLE GATE ARRAY BASED ACCELERATOR SYSTEM

CROSS REFERENCE TO RELATED APPLICATIONS

This application is a divisional of prior pending U.S. patent application Ser. No. 11/737,605, filed Apr. 19, 2007, which is herein incorporated by reference in its entirety. Any disclaimer that may have occurred during the prosecution of the above-referenced application(s) is hereby expressly rescinded, and reconsideration of all relevant art is respectfully requested.

BACKGROUND

Web search based ad services and search engines have become important tools for providing information to users. One factor in attracting users and advertisers is providing relevant information and ads for a given search query. Search relevance may be determined by a ranking function that ranks resultant documents according to their similarities to the input query.

Information retrieval (IR) researchers have studied search relevance for various search engines and tools. Representative methods include Boolean, vector space, probabilistic, and language models. Earlier search engines and tools were mainly based on such IR algorithms. These search engines and tools incorporate in varying degrees the concept of the ranking function. Many factors may affect the ranking function for search relevance. These factors may include page content, title, anchor, URL, spam, and page freshness. It is extremely difficult to manually tune ranking function parameters to accommodate these factors for large-scale data sets, such as those that are common in many applications including World Wide Web ("Web") applications and speech and image processing. For these large data sets, machine based learning algorithms have been applied to learn complex ranking functions from large-scale data sets.

Early algorithms for ranking function learning include Polynomial-based regression, Genetic Programming, RankSVM and classification-based SVM. However, these algorithms were only evaluated on a small-scale dataset due to the high computational cost. In fact, these traditional machine-learning algorithms operate slowly when searching large-scale data sets. Users often wait many hours, days, or even weeks to get results from these data sets. This slow computation time may be due, in part, to a typical personal computer (PC) being unable to exploit full parallelism in machine-learning algorithms efficiently.

Instruction level parallelism techniques somewhat improve the processing time. More particularly, distributed implementations with process level parallelism are faster than many of the PC central processing units (CPUs), which execute instructions in sequential manner. However, distributed implementations occupy many machines Additionally, for some algorithms, distributed computing yields poor speed improvement per processor added due to communication cost. A Graphics Processing Unit (GPU)-based accelerator could only accelerate a limited spectrum of machine learning algorithms due to its special hardware structure optimized for graphics applications. Thus, memory access bandwidth, communication cost, flexibility and granularity of parallelism remain bottlenecks for these solutions.

SUMMARY

An accelerator system and method is provided that, according to one exemplary implementation, utilizes FPGA technology to achieve better parallelism and flexibility. The FPGA-based accelerator uses a PCI controller to communicate with a host CPU. A memory hierarchy composed of embedded Random Access Memory (RAM) in the FPGA, Static Random Access Memory (SRAM) and Synchronous Dynamic Random Access Memory (SDRAM), allows the FPGA assisted accelerator to take advantage of memory locality in algorithms.

According to another exemplary implementation, an FPGA-based accelerator system is combined with a relevance-ranking algorithm, such as the algorithm known as RankBoost, to increase the speed of a training process. Using an approximated RankBoost algorithm reduces the computation and storage scale from $O(N^2)$ to $O(N)$. This algorithm could be mapped to the accelerator system to increase the speed of the pure software implementation by approximately 170 times. Several techniques assist in achieving the acceleration rate. The algorithm and related data structures associated with the FPGA-based accelerator may be organized to enable streaming data access and, thus, increase the training speed. The data may be compressed to enable the system and method to be operable with larger data sets. At least a portion of the approximated RankBoost algorithm may be implemented as a single instruction multiple data streams (SIMD) architecture with multiple processing engines (PEs) in the FPGA. Thus, large data sets, such as a training set can be loaded on memories associated with an FPGA to increase the speed of the relevance ranking algorithm.

By virtue of this system, a user can train a ranking model with much less time and cost, so they can attempt different learning parameters of the algorithm in the same time, or carry out a study that depends on numerous ranking models.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

An FPGA-based accelerator system for machine learning as described and claimed herein accelerates selected algorithms by providing better processing parallelism and memory access. The accelerator system may include an acceleration device, which may include a substrate, such as a Peripheral Component Interconnect (PCI) card, with a Field-Programmable Gate Array (FPGA) and memories acting as caches, e.g., SRAM, SDRAM, and so forth, connected to a computing device. One or more algorithms may be implemented on one or more of the FPGAs with direct parallel architecture and/or pipelined architecture to exploit both application parallelism and direct functional logic implementation. The PCI could also be replaced by other computer buses, including but not limited to PCI-X, PCI-Express, HyperTransport, Universal Serial Bus (USB) and Front-Side Bus (FSB).

A training data set or other data may be loaded onto one or more memories on the accelerator board, or onto embedded memories in the FPGA, to increase memory access bandwidth and data locality. The training data set may comprise information collected from Web searches to assess relevancy, and other characteristics. The system may include or be associated with one or more PCs or other computing devices, each computing device having one or more accelerator cards.

Exemplary System

Accelerator System Architecture

Figure 1:
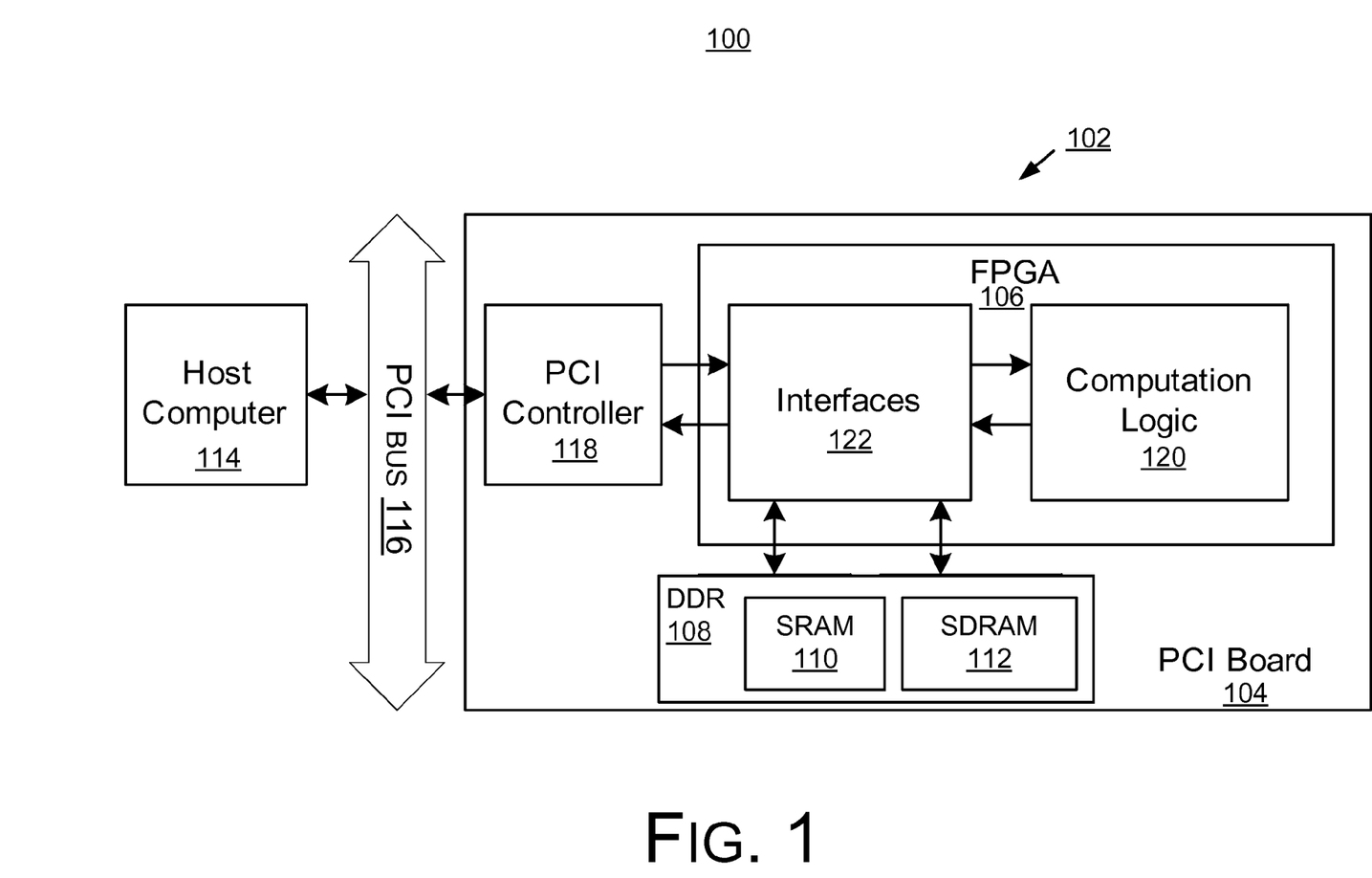
FIG. 1 shows an exemplary architecture of an FPGA based accelerator system for machine learning

An exemplary system for use as an accelerator is shown in FIG. 1. The accelerator system 100 may include an acceleration device 102 comprising a Peripheral Component Interface (PCI) board 104 with a Field-Programmable Gate Array (FPGA) 106 and Double Data Rate (DDR) memory 108, e.g., SRAM 110, SDRAM 112, and so forth, connected to a computing device such as a host computer 114. The PCI board 104 may interface with a PCI bus 116 on or associated with the host computing device 114. The PCI board 104, and/or devices thereon, may communicate with the bus 116 thorough a PCI controller 118. The FPGA 106 may comprise computation logic 120 that communicates to the DDR memory devices 108 and/or the PCI controller 118 through one or more interfaces 122.

Training data or other data being accessed by the FPGA 106 may be loaded to DDR memory 108, including SRAM 110 or SDRAM 112, on the PCI board 104, or to embedded memories in the FPGA 106, in order to increase memory access bandwidth and data locality. Software loaded on the computer 114 may be capable of programming or re-programming the FPGA 106 at any time during processing.

Figure 2:
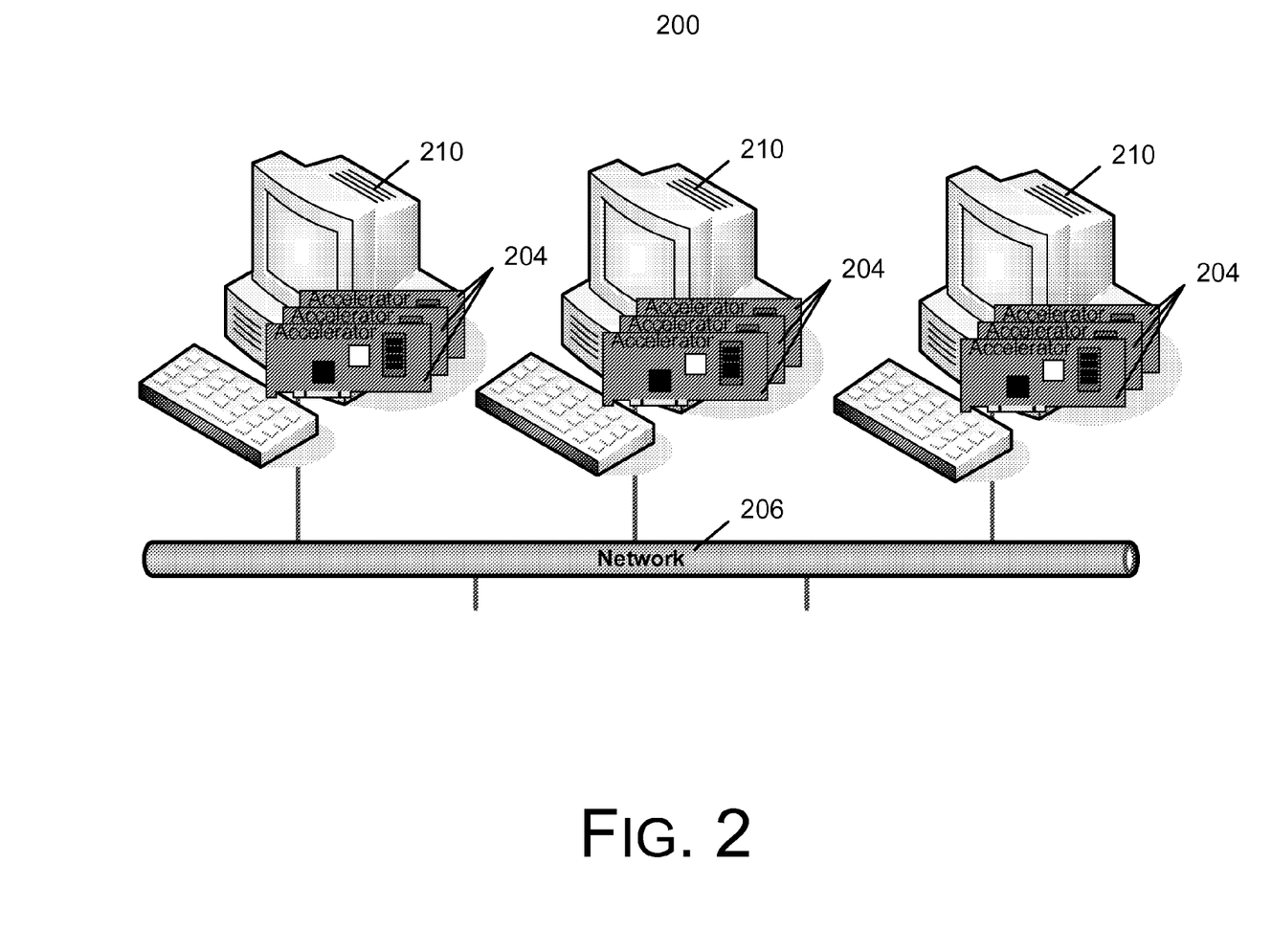
FIG. 2 shows an exemplary deployment of the accelerator.

As shown in FIG. 2, an acceleration system 200 may be composed of one or more computing devices 210, similar to computer 114, with each computing device 210 having one or more PCI cards 204, similar to PCI board 104. The computing devices 210 may be connected through a network 206. Thus, multiple cards 204 on multiple computing devices 210 may process data in parallel and thereby handle larger scale algorithms.

Figure 3:
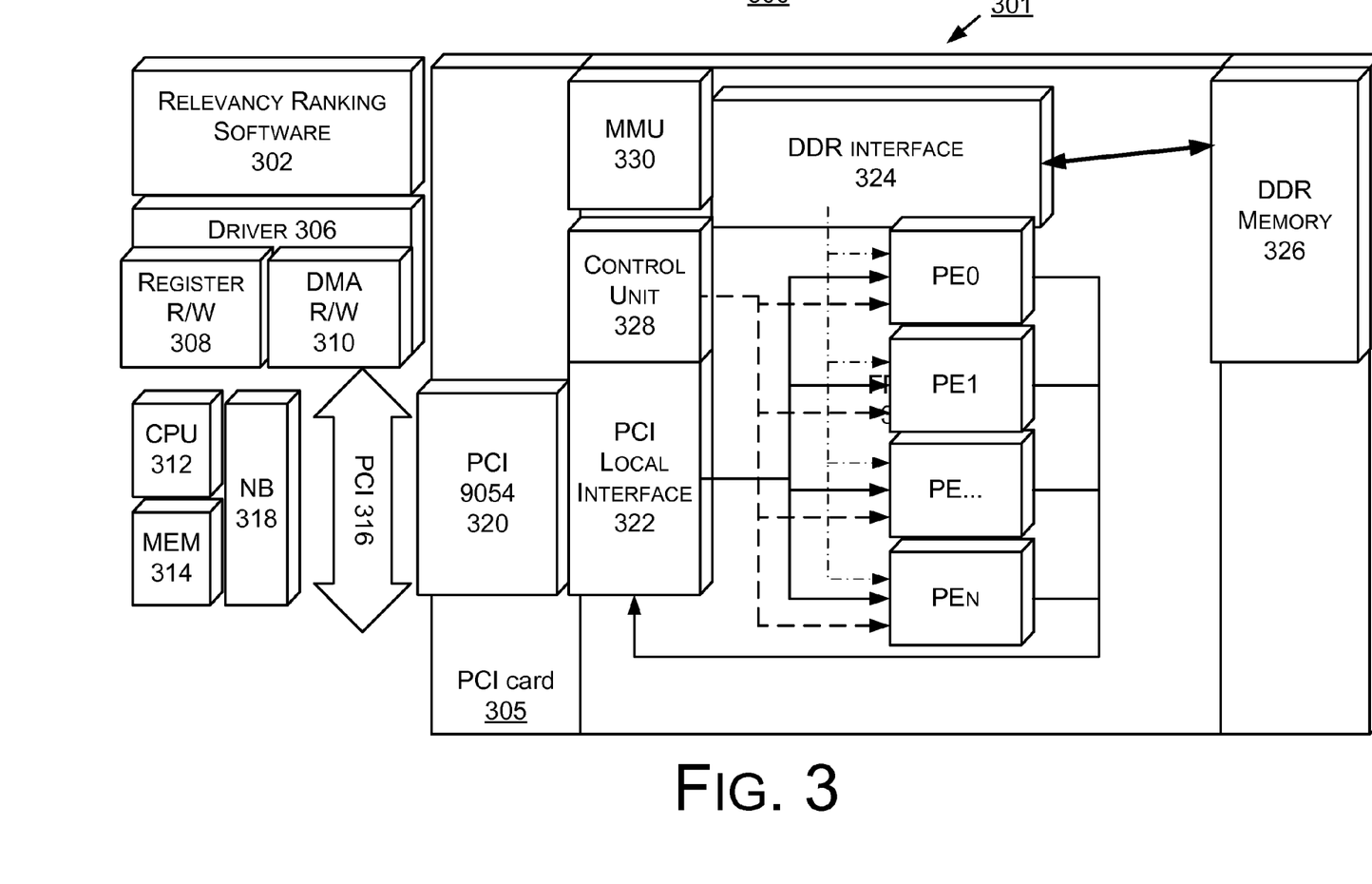
FIG. 3 shows an exemplary system architecture for an accelerator operable to perform relevance-ranking.

FIG. 3 shows a block diagram of a system 300 that is operable to implement relevance-ranking software 302 on an FPGA 304 residing on a substrate, such as a PCI card 305. The relevance ranking software 302 may have, or be associated with, a driver 306 having a register read/write (R/W) module 308 and/or a direct memory access read/write (DMA R/W) module 310 for operation of the software 302 with the CPU 312 and memory store 314 through a PCI 316 and/or Northbridge (NB) 318. The PCI card 305 may have a PCI 9054 Chip 320 or other 32-bit PCI bus mastering interface chip in order to facilitate communication between the FPGA 304 and the PCI 316.

The FPGA 304 may include a PCI local interface 322 for interfacing with the PCI 9054 chip 320. The PCI local interface 322 may also connect to the processing engine (PE) units, e.g., PE0, PE1, and PEn. The PE units implement the computation logic. The FPGA 304 may also have a DDR interface 324 for interfacing with DDR memory 326. The FPGA 304 may additionally have a control unit 328 for controlling the processing units PE0, PE1, PW, and PEn by sending a signal to the PE units. The FPGA 304 may also have a memory management unit (MMU) 330 for aligning or managing data for faster processing. The processing engines of the FPGA 304 may provide an output to the PCI local interface 320 for further implementation or use.

Figure 4:
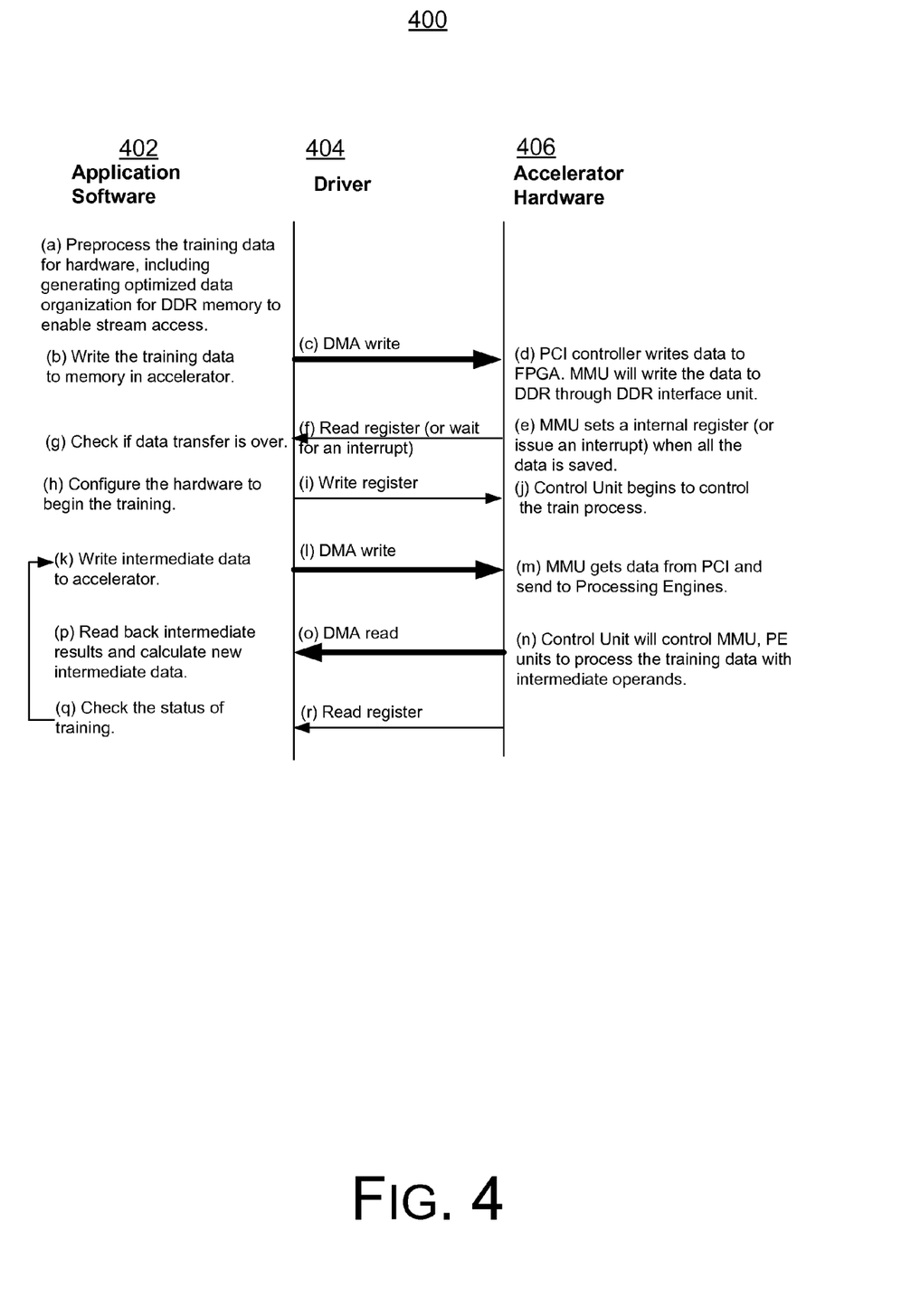
FIG. 4 shows an exemplary working flow of the accelerator system.

FIG. 4 illustrates an exemplary workflow 400 for processing and utilizing the training data in a system such as shown in FIG. 3. The first column 402 represents actions taken by the application software. The second column 404 represents driver-side activity. The third column 406 describes actions performed on, or by, hardware, such as accelerator device 301. In the following, steps (a)-(r) are steps for training. At (a), application software will process the training data for hardware. The possible processing may include organizing data in the sequence of how the FPGA logic will access and utilize it. At (b), application software will call the write routine in the driver (at (c)) to write the data to memories on the accelerator. The write routine may be implemented with a direct memory access (DMA) method to achieve high bandwidth access to the accelerator. At (d), upon receiving the training data, the PCI controller on the accelerator will write the data to the FPGA. Then the memory management unit (MMU) in the FPGA will write the data to DDR memory (or other cache memories). At (e), when all the data has been saved to the memory, the MMU may set a register, or issue an interrupt through PCI controller, indicating that the data transfer has been finished and the application software may proceed. At (g), the application software may check the status of the data transfer through register read routine in the driver (at (f)), or wait for the interrupt. At (h), application software configures the hardware to begin the training process by calling register write routine in the driver (at (i)). At (j), the control unit begins to control other hardware blocks to train using the training data. In the training process, at (k) application software may write (at (l)) some intermediate data to the accelerator hardware. At (m), the MMU in the accelerator sends this data to participate the training. At (p), this intermediate data may be generated from intermediate results of the training process (at (n)). At (q), the software may check the status of the training (at (r))) to determine if the training process needs to be continued for another round. The software continues to monitor the training process to decide when the training rounds should be stopped.

Data Organization

The accelerator system supports hierarchical memory organization and access methods using SDRAM, SRAM and RAM/registers within the FPGA.

According to one example, training data that will be iteratively used may be loaded onto SDRAM onboard an accelerator device, such as accelerator device 301. The training data loaded in the SDRAM may be organized according to its access order in logic associated with the FPGA by a software tool so that the FPGA can fetch data in a so-called, and well-known, "burst" mode, thus enabling high bandwidth access to the data set.

Randomly used large-scale data structures could be loaded to SRAM onboard the accelerator device, such as accelerator device 301, and associated with an FPGA, such as FPGA 304. According to this implementation, the SRAM may be used as a large low latency cache.

Temporary data structures, such as intermediate variables, parameters, and so forth, and results, e.g., the learned model, could be stored in distributed memory or registers inside the FPGA, which would act as high bandwidth, low latency cache. The data could be utilized without needing to access memory off of the FPGA, which would enhance the access speed of the cache.

Stream Data Processing Architecture

A streaming data access architecture and method may be incorporated with the accelerator system and/or the data organization structure, such as described above, to enable fast access to data in the host memory hierarchy and to decrease the amount of hardware/software communication for selected algorithms. Software, which may be provided by or on a host CPU, may configure a PCI bridge chip on the accelerator board to fetch data from a host memory hierarchy. The host memory hierarchy may provide a variety of memories including hard disks. The data will contain necessary information (generated and inserted by software), with which FPGA logic can perform computing functions over the data stream without interaction with software or drivers. Furthermore, the data will be organized in the sequence of how FPGA logic is accessing and utilizing it, such that input data is consumed at the time FPGA logic receives it. The FPGA may buffer the result for a delayed read from the software, which reduces the time and processing cost of hardware/software communication.

Data Compression/Decompression

A bit-map based data compression/decompression method for the architecture may be implemented to increase memory capacity and bandwidth available in the accelerator system. Training data may be compressed by conventional compression software and stored in the memories associated with the acceleration device. The FPGA may then read and decompress the data before performing computations. Implementing compression and decompression techniques with the FPGA may increase the virtual bandwidth from a DDR to a PE by 2-4 times the virtual bandwidth for uncompressed data.

Relevance-Ranking Algorithm

A machine learning, relevance ranking, algorithm may be implemented using the accelerator system. Generally, when ranking objects, the goal is to find a ranking function to order the given set of objects. Such an object is denoted as an instance x in a domain (or instance space) X. As a form of feedback, information about which instance should be ranked above (or below) one another is provided for every pair of instances. This feedback is denoted as function $\Phi$: $X \times X \rightarrow R$, where $\Phi(x_0, x_1) > 0$ means $x_1$ should be ranked above $x_0$, and $\Phi(x_0, x_1) < 0$ means $x_0$ should be ranked above $x_1$. A learner then attempts to find a ranking function H: $X \rightarrow R$, which is as consistent as possible to the given $\Phi$, by asserting $x_1$ is preferred over $x_0$ if $H(x_1) > H(x_0)$.

A relevance-ranking algorithm may be used to learn the ranking function H by combining a given collection of ranking functions. The relevance-ranking algorithm may be pair-based or document-based. The psuedocode for one such relevance ranking algorithm, is shown below:

Initialize: Distribution D over $X \times X$

Do for t=1, . . . , T:

(1) Train WeakLearn using distribution $D_t$.

(2) WeakLearn returns a weak hypothesis $h_t$, (3) Choose $\alpha_t \in R$ (4) Update weights: for each pair $(d_0, d_1)$:

$$D_{t+1}(d_0, d_1) = \frac{D_t(d_0, d_1)\exp(-\alpha_t(h_t(d_0) - h_t(d_1)))}{Z_t}$$

where $Z_t$ is the normalization factor:

$$Z_t = \sum_{x_0, x_1} D_t(d_0, d_1)\exp(-\alpha_t(h_t(d_0) - h_t(d_1))).$$

Output: the final hypothesis:

$$H(x) = \sum_{t=1}^{T} \alpha_t h_t$$

The relevance-ranking algorithm is utilized in an iterative manner. In each round, a procedure named "WeakLearn" is called to select the best "weak ranker" from a large set of candidate weak rankers. The weak ranker has the form $h_t$: $X \rightarrow R$ and $h_t(x_1) > h_t(x_0)$ means that instance $x_1$ is ranked higher than $x_0$ in round t. A distribution $D_t$ over $X \times X$ is maintained in the training process. Weight $D_t(x_0, x_1)$ will be decreased if $h_t$ ranks $x_0$ and $x_1$ correctly ($h_t(x_1) > h_t(x_0)$), and increased otherwise. Thus, $D_t$ will tend to concentrate on the pairs that are hard to rank. The final strong ranker H is a weighted sum of the selected weak rankers in each round.

The WeakLearn algorithm may be implemented to find the weak ranker with a maximum r(f, $\theta$), by generating a temporary variable $\pi$(d) for each document. The WeakLearn algorithm may be defined as follows:

Given: Distribution $D(d_0, d_1)$ over all pairs

Initialize: (1) For each document d(q):

Compute $\pi(d(q)) = \Sigma_{d'(q)}(D(d'(q),d(q)) - D(d(q),d'(q)))$ (2) For every feature $f_k$ and every threshold $\theta^k_s$:

$$\text{Computer } (f_k, \theta^k_s) = \sum_{d(q): f_k(d(q)) > \theta^k_s} \pi(d(q))$$

(3) Find the maximum $|r^*(f_{k^*}, \theta_{s^*}^{k^*})|$ (4) Compute:

$$\alpha = \frac{1}{2}\ln\left(\frac{1 + r^*}{1 - r^*}\right)$$

Output: weak ranking $(f_{k^*}, \theta_{s^*}^{k^*})$ and $\alpha$.

To extend the relevance-ranking algorithm to Web relevance ranking, training pairs may be generated and weak rankers may be defined. To generate the training pairs, the instance space for a search engine may be partitioned according to queries issued by users. For each query q, the returned documents may be rated a relevance score, from 1 (means 'poor match') to 5 (means 'excellent match') using a manual or automated process. Unlabeled documents may be given a relevance score of 0. Based on the rating scores (ground truth), the training pairs for the relevance-ranking algorithm may be generated from the returned documents for each query.

So-called "weak rankers" may be defined as a transformation of a document feature, which is a one-dimensional real value number. Document features can be classified into query dependent features, such as query term frequencies in a document and term proximity, and query independent features, such as PageRank, and so forth. Thus, the same document may be represented by different feature vectors for different queries based upon its query-dependent features.

In keeping with the previous algorithm example, a document may be designated as d(q), a pair as {d$_1$(q), d$_2$(q)}, and d$^i_j$ means a document for query q$_i$. The k$_{th}$ feature for document is denoted as f$_k$(d$^i_j$). With these notations, an alternative relevance-ranking algorithm may be implemented as follows.

Initialize: initial distribution D over X×X
Given: N$_q$ queries {q$_i$|i=1, ..., N$_q$}.
N$_i$ documents {d$^i_j$|j=1, ..., N$_i$} for each query q$_i$, where $\sum_{i=1}^{N_q} N_i = N_{doc}$.
N$_f$ features {f$_k$(d$^i_j$)|j=1, ..., N$_f$} for each document d$^i_j$
N$^k_\theta$ candidate thresholds {θ$^k_s$|s=1, ..., N$^k_\theta$} for each f$_k$.
N$_{pair}$ pairs (d$^i_{j1}$, d$^i_{j2}$) generated by ground truth rating {R(q$_i$, d$^i_j$)} or {R$^i_j$}.
Initialize: initial distribution D(d$^i_{j1}$, d$^i_{j2}$) over X×X
Do for t=1, ..., T:
(1) Train WeakLearn using distribution D$_t$.
(2) WeakLearn returns a weak hypothesis h$_t$, weight α$_t$
(3) Update weights: for each pair (d$_0$, d$_1$):

$$D_{t+1}(d_0, d_1) = \frac{D_t(d_0, d_1)\exp(-\alpha(h_t(d_0) - h_t(d_1)))}{Z_t}$$

where Z$_t$ is the normalization factor:

$$Z_t = \sum_{x_0, x_1} D_t(d_0, d_1)\exp(-\alpha_t(h_t(d_0) - h_t(d_1))).$$

Output: the final hypothesis:

$$H(x) = \sum_{t=1}^{T} \alpha_t h_t$$

For the relevance-ranking algorithms described by example above, WeakLearn may be defined as a routine that uses the N$_f$ document features to form its weak rankers, attempting to find the one with the smallest pair-wise disagreement relative to distribution D over N$_{pair}$ document pairs. The weak ranker may be defined by the following relationship:

$$h(d) = \begin{cases} 1 & \text{if } f_i(d) > \theta \\ 0 & \text{if } f_i(d) \leq \theta \text{ or } f_i(d) \text{ is undefined} \end{cases}$$

To find the best h(d), the weak learner checks all of the possible combinations of feature f$_i$ and threshold θ. The WeakLearn algorithm may be implemented to ascertain a maximum r(f, θ) by generating a temporary variable π(d) for each document. Intuitively, π contains information regarding labels and pair weights, and the weak ranker only needs to access π in a document-wise manner for each feature and each threshold, that is O(N$_{doc}$N$_f$N$_\theta$), in a straightforward implementation. Based on this, an alternative weak learner may be utilized using an integral histogram to further reduce the computational complexity to O(N$_{doc}$N$_f$). Because of this relatively low computational complexity, the algorithm may be implemented in both software and hardware, e.g., an accelerator system utilizing an FPGA, as described above.

According to the implementation, r may be calculated in O(N$_{doc}$N$_f$) time in each round using an integral histogram in O(N$_{doc}$N$_f$) time. First, feature values {f$_k$(d)} in a dimension of the whole feature vector (f$_1$, ..., f$_{N_f}$) may be classified into N$_{bin}$ bins.

The boundaries of these bins are:

$$\theta^k_s = \frac{f^k_{max} - f^k_{min}}{N_{bin}} \cdot s + f^k_{min}, s = 0, 1, \ldots, N_{bin},$$

where f$_{max}^k$ and f$_{min}^k$ are maximum and minimum values of all f$_k$ in the training data set. Then each document d can be mapped to one of the bins according to the value of f$_k$(d):

$$Bin_k(d) = \text{floor}\left(\frac{f_k(d) - f^k_{min}}{f^k_{max} - f^k_{min}} \cdot N_{bin} - 1\right)$$

The histogram of π(d) over feature f$_k$ is then built using:

$$Hist_k(i) = \sum_{d: Bin_k(d)=i} \pi(d), i = 0, \ldots, (N_{bin} - 1)$$

Then, an integral histogram can be determined by adding elements in the histogram from the right (i=N$_{bin}$−1) to the left (i=0). That is, $$Integral_k(i) = \sum_{a > i} Hist_k(a), i = 0, \ldots, (N_{bin} - 1)$$

Exemplary Implementation of Relevance-Ranking Algorithm

A relevance-ranking algorithm, such as described above, may be implemented using an FPGA based accelerator system, also described above. The main computing data structure is a histogram, mapped to the architecture of single instruction multiple data streams (SIMD) with distributed memories. The SIMD architecture is capable of separately building several integral histograms with multiple PE units at the same time, as described above.

Software provided on or to the host computer will send the quantized feature values to a DDR memory through the PCI bus, PCI controller and FPGA. As described above, the data may be organized to enable streaming memory access, which can make full use of DDR memory bandwidth. In each training round, the software will call WeakLearn to compute π(d) for every document, and send π(d) to a First In First Out (FIFO) queue in the FPGA. The control unit (CU) in the FPGA will direct the PE arrays to build histograms and integral histograms, and will then send the results r(f,θ) as output to the FIFO queue. The CU is implemented as a finite state machine (FSM), which halts or resumes the pipeline in PE units according to the status of each FIFO. When the CU indicates that the calculation of r is finished, the software will read back these r values and select the maximum value. Then the software will update the distribution D(d$_0$, d$_1$) over all pairs and begin the next round.

Figure 5:
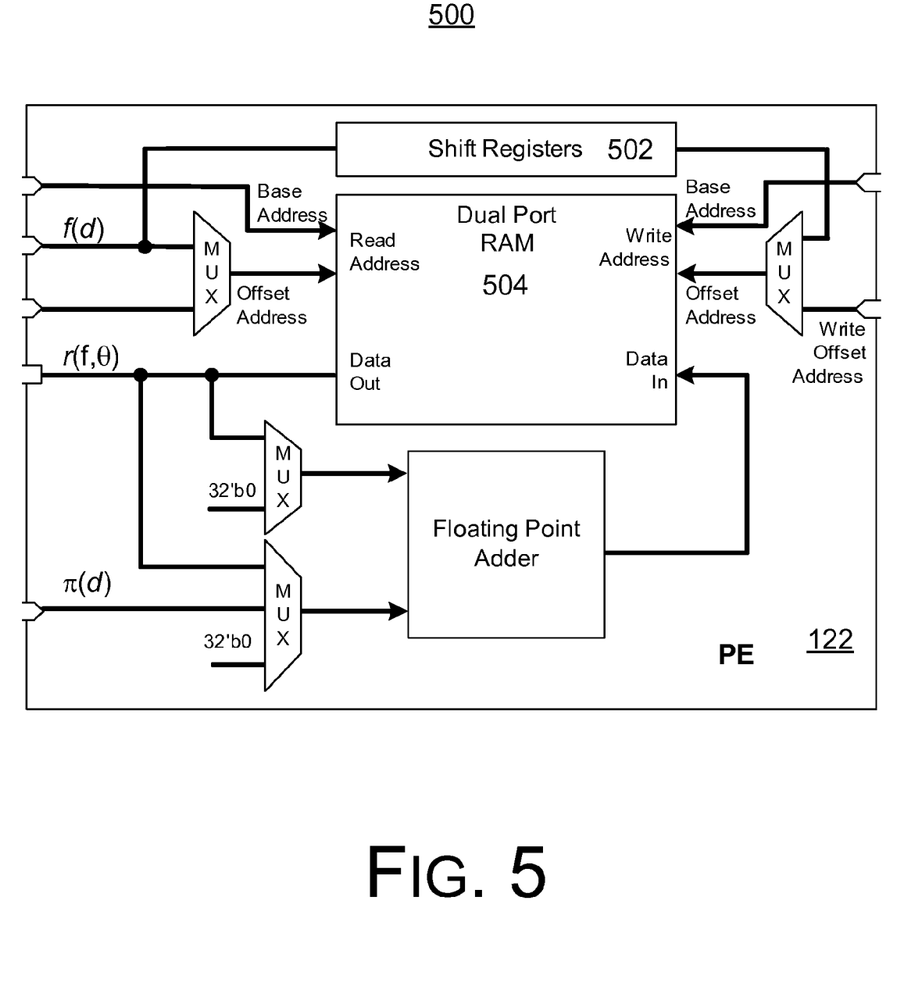
FIG. 5 shows an exemplary architecture of a processing engine (PE) for an accelerator operable to perform relevance-ranking.

It is noted that the micro-architecture of the PE supports fully-pipelined operation, which enhances the performance of hardware, particularly with regard to machine learning algorithms, such as a relevance-ranking algorithm. FIG. 5 illustrates an exemplary micro-architecture of a processing engine 500, such as PE0, PE1, or PEn, previously described. This micro-architecture may be used in building the integral histogram for a relevance ranking algorithm, such as Rank-Boost. The dual port RAM 502 is used to store the histograms and integral histograms in the building process. The base address of the RAM indexes the feature and the offset address indexes the bin of histogram or integral histogram as defined in the $\text{Hist}_k(i)$ and $\text{Integral}_k(i)$ equations described above. The shift registers 504 are used to delay the input feature f(d). First, the histogram is built. Feature values $f_k(d)$ are input as the offset address to read out the corresponding intermediate values $\text{Hist}_k(i)$ of the bin i. Then the other input $\pi(d)$ will be added to $\text{Hist}_k(i)$, and the result will be saved to the same bin where $\text{Hist}_k(i)$ is read out.

Figure 6:
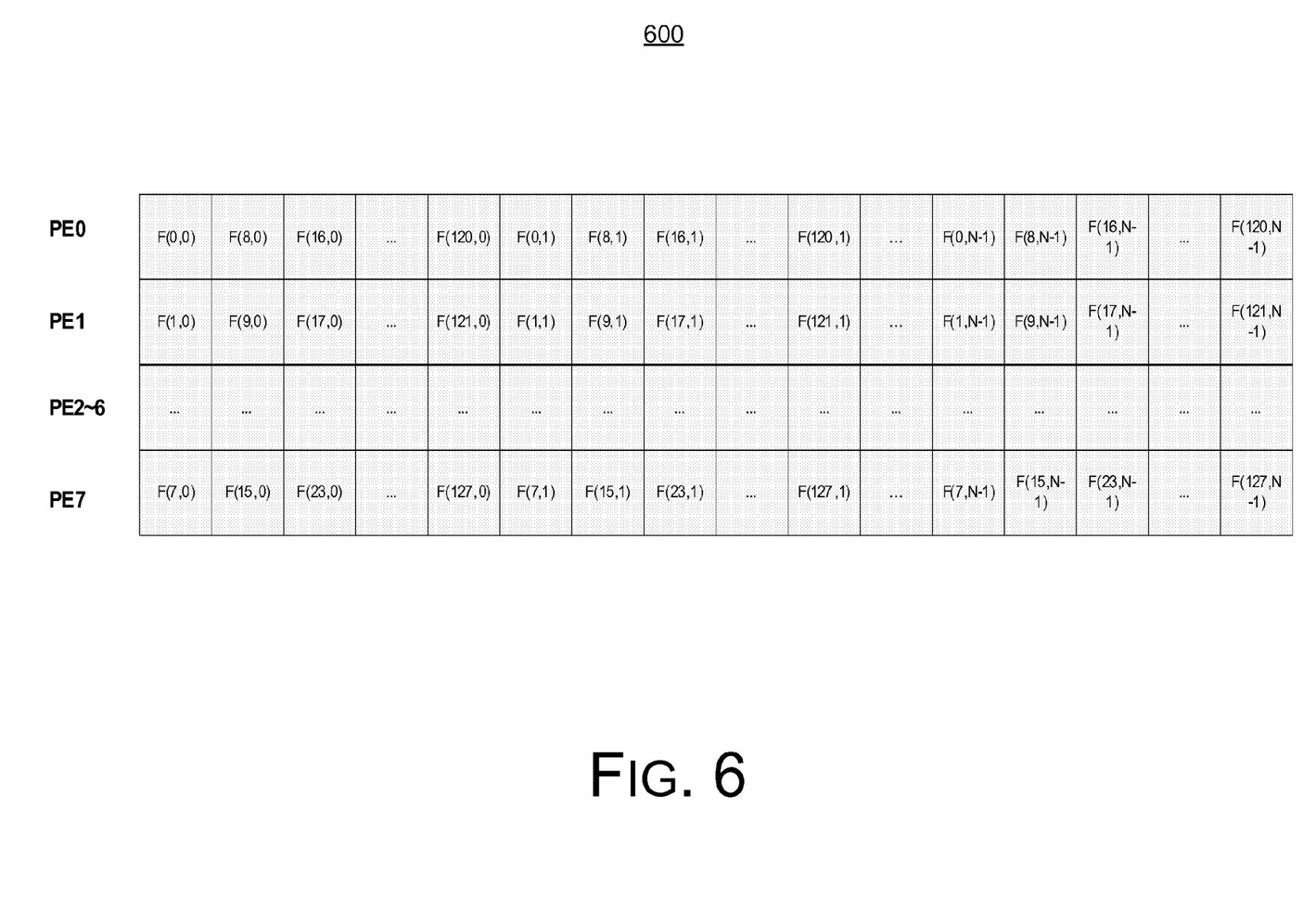
FIG. 6 shows data sequences for the processing engine shown in FIG. 5.

An example data input 600 into 8 PE arrays with 16 features per PE is illustrated in FIG. 6. First, software aligns a given amount data in its original format. A software tool may be used to rearrange this data in the memory to generate binary data for storage in a memory block. The data is ordered according to the order that the FPGA will access the data. Moreover the input data may be organized to be aligned with the PE, as shown in FIG. 6, thereby mapping the data structure to the memories. This data organization enables a streaming memory access. The integral histogram can be implemented with this data structure based on the histogram stored in the dual port RAM. The values are read out, added and then stored back to the memory according to the $\text{Integral}_k(i)$ equation described above. At last the final result $r(f, \theta)$ will be read out.

Figure 7:
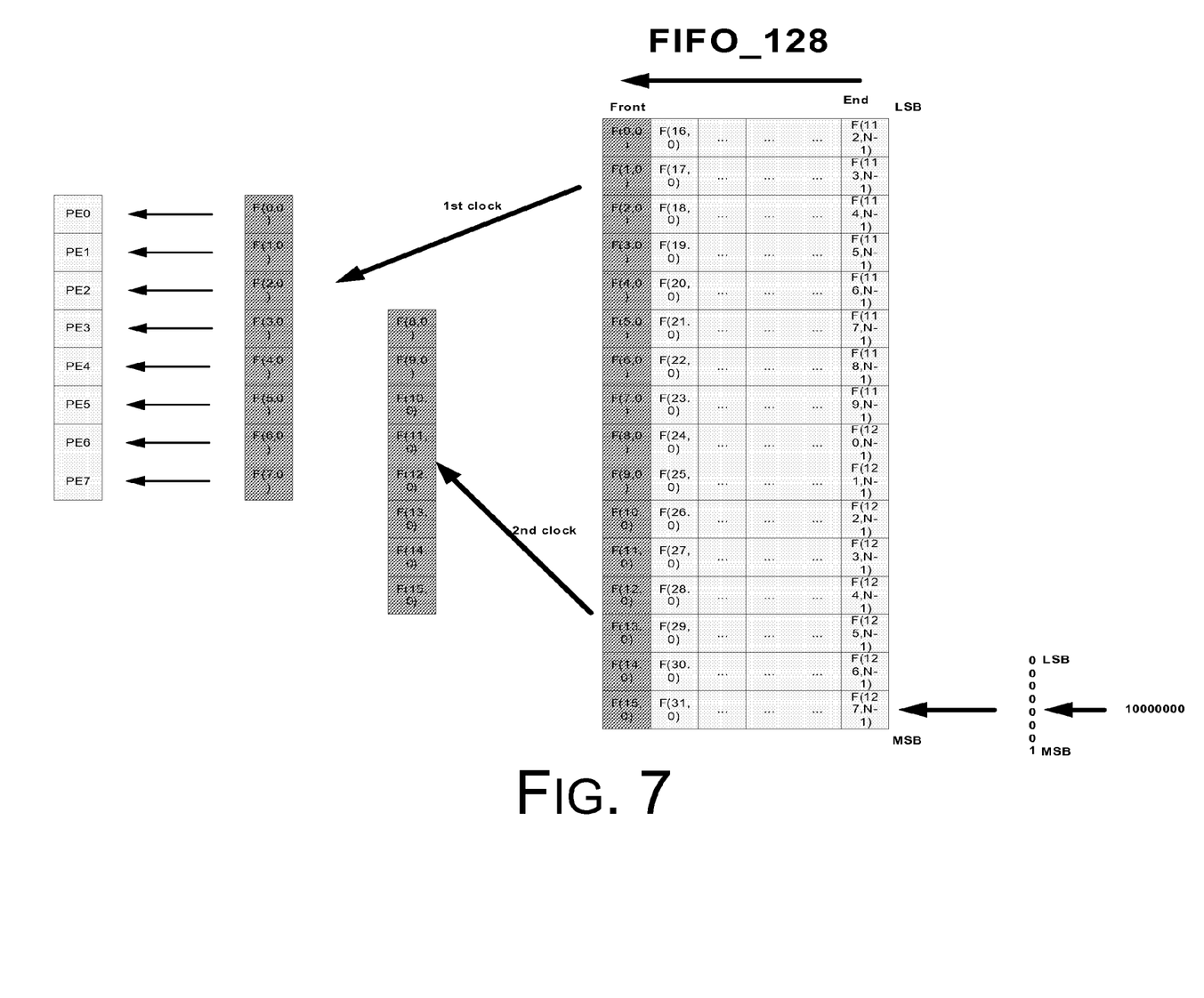
FIG. 7 shows an exemplary data format and processing sequence for a First In First Out (FIFO) buffer.

A streaming memory access organization can also be used for the FIFO buffer that will provide data from the DDR memory to the group of PE units. The width of the FIFO associated with the PE array may be, for example, 128 bits, which is equivalent to 16 bytes. The data in the FIFO can be arranged as shown in FIG. 7 to map the data to the PE units and further enable streaming memory access to data transferred from the DDR to the FPGA. Thus, running the relevance-ranking algorithm utilizing an FPGA and incorporating streaming memory access provides fast processing of large data sets.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   a Field Programmable Gate Array (FPGA) provided on a substrate;
   a memory connected to the substrate and the FPGA;
   an interface for connecting the FPGA to a computing device; and
   a relevance-ranking algorithm for documents implemented at least in part by the FPGA, the FPGA configured to generate a result of the relevance-ranking algorithm based at least in part on the FPGA building an integral histogram based at least in part on feature values corresponding to one or more terms in one or more of the documents included in training data associated with the relevance-ranking algorithm.

2. A system as recited in claim 1, wherein the substrate comprises a Peripheral Component Interface (PCI) board, PCI-X board, PCI-Express board, HyperTransport board, Universal Serial Bus (USB) board or Front-Side Bus (FSB) board.

3. A system as recited in claim 1, wherein the FPGA has at least one processing engine, and the processing engine is controlled by a control unit.

4. A system as recited in claim 3, wherein the memory comprises Double Data Rate (DDR) memory.

5. A system as recited in claim 1, wherein the relevance ranking algorithm incorporates a RankBoost algorithm.

6. A system as recited in claim 1, wherein the FPGA comprises a number of processing engine (PE) unit, and wherein data is arranged in a First In First Out (FIFO) buffer to map the data onto the PE unit.

7. A system as recited in claim 1, wherein the FPGA associated with a computing device is a first FPGA associated with a first computing device, the system further comprising a network connecting the first FPGA associated with the first computing device to a second FPGA associated with the second computing device.

8. A system as recited in claim 7, wherein the first and second computing devices are each associated with multiple FPGA devices.

9. A method comprising:
   mapping data in one or more data structures to one or more memories associated with a Field Programmable Gate Array (FPGA), wherein at least a portion of the data includes training data associated with a relevance-ranking algorithm for documents; and
   learning the relevance ranking-algorithm based at least in part on logic of the FPGA building one or more integral histograms based at least in part on feature values associated with the training data corresponding to one or more terms of at least one of the documents.

10. A method as recited in claim 9, wherein the relevance-ranking algorithm comprises at least a portion of a RankBoost algorithm.

11. A method as recited in claim 9, further comprising loading the training data into at least one of the one or more memories associated with the FPGA, wherein the training data is organized according to a streaming memory access order for streaming memory access by processing engines (PEs) of the FPGA for the building of the one or more integral histograms, wherein the training data includes the feature values classified into bins that define at least in part the streaming memory access order.

12. A method as recited in claim 9, further comprising utilizing memory within the FPGA as a cache memory.

13. The method of claim 9, further comprising compressing data in the one or more data structures prior to mapping the one or more data structures in the one or more memories.

14. The method of claim 9, wherein the relevance-ranking algorithm is document based.

15. The method of claim 9, further comprising organizing the data according to input data structure of processing units in the FPGA and according to the order by which the FPGA will access the data.

16. A system comprising:
   a memory; and
   a Field Programmable Gate Array (FPGA) connected to the memory, the FPGA configured to learn a relevance-ranking algorithm for documents by processing engines (PEs) of the FPGA building integral histograms using training data associated with term-based feature values of the documents, wherein the term-based feature values are organized into bins that define at least in part a streaming memory access order for storing at least a portion of the training data in the memory for streaming memory access by each of the PEs for the building of the integral histograms.

17. A system of claim 16, wherein the memory includes at least a portion of the training data.

18. A system of claim 16, wherein the FPGA uses the processing engines (PEs) of the FPGA to build the integral histograms.

19. A system of claim 16, wherein the FPGA is configured to build the integral histograms in parallel using the training data associated with the relevance-ranking algorithm.

20. A system of claim 16, wherein the training data is associated with the relevance-ranking algorithm; and
building the integral histograms comprises summing elements of the integral histograms.

* * * * *